United States Patent
Yang et al.

(10) Patent No.: US 11,995,178 B2
(45) Date of Patent: May 28, 2024

(54) PROTECTION OF KERNEL FROM CODE REUSE ATTACKS

(71) Applicant: INTERNATIONAL BUSINESS MACHINES CORPORATION, Armonk, NY (US)

(72) Inventors: Dong Yan Yang, Beijing (CN); Qing Feng Hao, Beijing (CN); Biao Cao, Beijing (CN); Xi Qian, Beijing (CN); Li Ping Hao, Beijing (CN); Xiao Feng Ren, Beijing (CN); YaLian Pan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 17/646,688

(22) Filed: Dec. 31, 2021

(65) Prior Publication Data

US 2023/0214480 A1    Jul. 6, 2023

(51) Int. Cl.
    *G06F 21/52*    (2013.01)
(52) U.S. Cl.
    CPC ........ *G06F 21/52* (2013.01); *G06F 2221/033* (2013.01)
(58) Field of Classification Search
    CPC .................... G06F 21/52; G06F 2221/033
    See application file for complete search history.

(56) References Cited

U.S. PATENT DOCUMENTS

| | | | |
|---|---|---|---|
| 6,466,996 B1 * | 10/2002 | Bonola | G06F 9/4411 710/36 |
| 8,578,483 B2 | 11/2013 | Seshadri | |
| 10,936,713 B2 * | 3/2021 | Dehon | G06F 21/6209 |
| 11,227,056 B2 * | 1/2022 | Tang | G06F 21/6218 |
| 2008/0222397 A1 | 9/2008 | Wilkerson | |
| 2014/0281137 A1 | 9/2014 | Circello | |
| 2016/0283404 A1 | 9/2016 | Xing | |
| 2017/0249178 A1 | 8/2017 | Tsirkin | |
| 2017/0249263 A1 | 8/2017 | Tsirkin | |
| 2019/0042730 A1 * | 2/2019 | Yamada | G06F 21/554 |

FOREIGN PATENT DOCUMENTS

| CN | 103955438 A | 7/2014 |
|---|---|---|
| CN | 105723377 A | 6/2016 |
| CN | 105224864 B | 5/2018 |

(Continued)

OTHER PUBLICATIONS

Backes, et al., "You Can Run But You Can't Read: Preventing Disclosure Exploits in Executable Code," CCS '14, Nov. 3-7, 2014, 12 pgs., <https://dl.acm.org/doi/10.1145/2660267.2660378>.

(Continued)

*Primary Examiner* — Ashokkumar B Patel
*Assistant Examiner* — William B Jones
(74) *Attorney, Agent, or Firm* — Anthony Curro

(57) ABSTRACT

Protection of a kernel from a sniff and code reuse attack. A kernel mode page table in initialized in a kernel. The kernel page entries in the kernel mode page table are set from s-pages to u-pages. Supervisor mode access prevention is enabled in the u-pages. Code contained in the kernel page entries in the u-pages is executed, the kernel page entries in the u-pages are capable of execution but are not capable of being accessed and read directly.

18 Claims, 4 Drawing Sheets

(56) References Cited

FOREIGN PATENT DOCUMENTS

| CN | 109564552 A | 4/2019 |
|---|---|---|
| WO | 2012082410 A3 | 8/2012 |

OTHER PUBLICATIONS

Brookes, et al., "ExOshim: Preventing Memory Disclosure Using Execute-Only Kernel Code," International Conference on Cyber Warfare and Security, Reading: 56-IX. Reading: Academic Conferences International Limited (2016), 13 pgs., <http://thayer.dartmouth.edu/tr/reports/tr15-001.pdf>.

Cimpanu, "Linux to Get Kernel 'Lockdown' Feature," ZDNet.com, Zero Day, Sep. 29, 2019, 7 pgs., <https://www.zdnet.com/article/linux-to-get-kernel-lockdown-feature/?from=timeline&isappinstalled=0>.

Crane, et al., "Readactor. Practical Code Randomization Resilient to Memory Disclosure," IEEE Xplore, 2015 IEEE Symposium on Security and Privacy, pp. 763-780, <https://ieeexplore.ieee.org/search/searchresult.jsp?newsearch=true&queryText=Readactor:%20Practical%20Code%20Randomization%20Resilient%20to%20Memory%20Disclosure>.

Currey, "[vs, 1/3] powerpc/mm/radix: Use KUEP API for Radix MMU," Patchwork.Kernel.org, Dec. 10, 2018, 2 pgs., <https://patchwork.kernel.org/project/kernel-hardening/patch/20181210070044.27503-2-ruscur@russell.cc/>.

Ellerman, "Linux Kernal Source Tree," Git.Kernel.Org, Apr. 18, 2019, 6 pgs., <https://git.kernel.org/pub/scm/linux/kernel/git/torvalds/linux.git/commit/?id=890274c2dc4c0a57ae5a12d6a76fa6d05b599d98>.

Fischer, "Supervisor Mode Execution Protection," Intel Corporation, NSA Trusted Computing Conference & Exposition, Sep. 21, 2011, 10 pgs., <https://web.archive.org/web/20160803075007/https://www.ncsi.com/nsatc11/presentations/wednesday/emerging_technologies/fischer.pdf>.

Gionta, et al., "Preventing Kernel Code—Reuse Attacks Through Disclosure Resistant Code Diversification," 2016 IEEE conference on Communications and Network Security (CNS), 9 pgs., <https://ieeexplore.ieee.org/document/7860485>.

IBM, "Power ISA Version 3.1," IBM Corporation, May 1, 2020, 1,538 pgs., <https://ibm.ent.box.com/s/nhjfw0x0Irbtyzmiaffnbxh2fuo0fog0>.

Kumar, "Patch v4 00/41] Kernel Userspace Access/execution Prevention with Hash Translation," OZLABS.org, Jun. 15, 2020, 3 pgs., <https://lists.ozlabs.org/pipermail/linuxppc-dev/2020-June/212508.html>.

Pomonis, et al., "kR/\X: Comprehensive Kernel Protection Against Just-In-Time Code Reuse," ACM, EuroSys '17, Apr. 23-26, 2017, 17 pgs., <https://dl.acm.org/doi/10.1145/3064176.3064216>.

Vahldiek-Oberwagner, et al., "ERIM: Secure, Efficient In-process Isolation With Protection Keys," USENIX Association, Proceedings of the 28th USENIX Security Symposium, Aug. 14-16, 2019, pp. 1221-1238, <http://www.usenixorg/conference/usenixsecurity19/presentation/vahldiek-oberwagner>.

Yiu, What is execute-Only-Memory (XOM)?, Arm Community, Jul. 7, 2017, 9 pgs., <https://community.arm.com/developer/ip-products/processors/b/processors-ip-blog/posts/what-is-execute-only-memory-xom# :~: text=execute%2DOnly%2DMemory%20(XOM)%20is%20a%20firmware%20protection,the%20protected%20APIs%20in%20XOM>.

International Searching Authority, Notification of Transmittal of the International Search Report and the Written Opinion of the International Searching Authority, or the Declaration, International Application No. PCT/CN2022/131918, International filing date: Nov. 15, 2022, dated Feb. 20, 2023, Applicant's reference: PF221068PCT, Date of completion: Jan. 31, 2023, pp. 1-8.

\* cited by examiner

PROTECTION OF KERNEL FROM CODE REUSE ATTACKS

FIELD OF THE INVENTION

The present invention is directed towards the field of computer security, and more particularly to protection of an operating system kernel from sniff-and-code reuse exploits.

BACKGROUND

As time proceeds, and computer hackers become increasingly sophisticated and creative, novel techniques are continuously developed for exploitation of computer security flaws. A fairly recent exploitation technique, called "return-oriented programming" or related "sniff-and-code reuse" exploits take advantage of a flaw in operating systems which allows an attacker to read selectively execute code snippets in an order determined by the attacker, to covertly perform functionality the attacker desires.

Several techniques have been developed to avoid code reuse exploits, including G-Free, address space layout randomization, binary code randomization, SEHOP, pointer authentication codes, control-flow integrity, code-pointer integrity, etc. Sniff-and-code reuse exploits, however, remain an issue which must be addressed in an efficient and easy to implement manner.

Presented is a novel technique for protection of an operating system kernel from code reuse exploits.

SUMMARY

Embodiments include a method, computer system, and a computer program product for protection of a kernel from sniff and code reuse attacks. A computing device initializes a kernel mode page table in a kernel. The kernel mode page table may be initialized by setting a bit in the page table. The computing device sets the kernel page entries in the kernel mode page table from s-pages (supervisor mode, in various embodiments) to u-pages (user mode, in various embodiments). In various embodiments of the invention, the kernel page entries are set within a user mode. The computing device enables supervisor mode access prevention in the u-pages. The computing device executes code contained in the kernel page entries in the u-pages which are capable of execution but not capable of being accessed and read directly These and other features and advantages will become apparent from the following detailed description of the exemplary embodiment(s), taken in conjunction with the accompanying drawings.

BRIEF DESCRIPTION OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
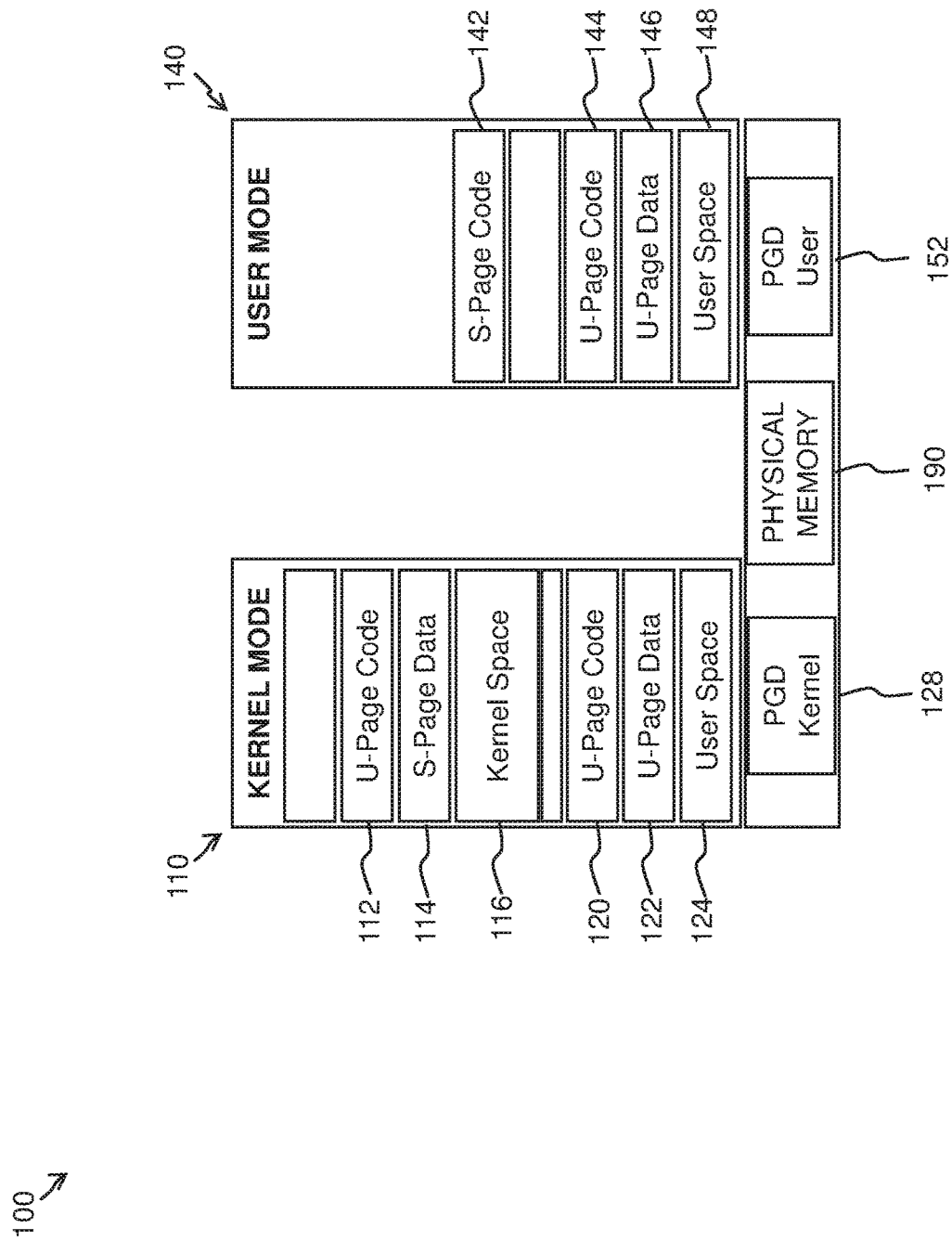
FIG. 1 depicts a system diagram illustrating a schematic diagram 100 of a kernel mode 110 and a user mode 140, according to an embodiment of the invention.

In response to the needs, the inventors propose a novel approach to protection of the kernel from sniff and code reuse attacks and related return-oriented programming attacks. The invention, in various embodiments, initializes a kernel mode page table in a kernel. The kernel page entries in the kernel mode page table are set to be u-pages rather than s-pages. Supervisor mode access prevention is enabled in the u-pages. Code contained in the kernel page entries is executed in the u-pages, where the kernel page entries in the u-pages are capable of execution but are not capable of being accessed and read directly. Since the kernel page entries can be executed, but cannot be accessed or read directly, it is impossible for a clever hacker to perform the various "return-oriented programming," "sniff and code reuse," or other attacks which require "reading" of kernel page entries, serving the goal of protection of the kernel and normal program execution.

In x86 architectures (as well as other less known computer architectures), running states of the processor are divided into various modes, sometimes known as "s-mode" and "u-mode." S-mode, also known as supervisor mode, allows for unlimited direct access of protected areas, whereas U-mode, also known as user mode, allows for limited access to code contained in the pages, while still allowing execution of code contained within the pages, to allow for the performance of various functionality, program execution, etc.

When "SMAP" or supervisor mode access prevention is enabled in x86 architectures, or others, user-space memory mappings are set in supervisor mode so that access from supervisor mode will cause a trap preventing further execution.

The present invention, in various embodiments, has broad applicability to computer hardware and software industries, and presents an easy, fast, cheap to implement manner of avoiding kernel code from being sniffed and attacked. No additional intermediate layers are introduced, so no extra overhead and more complex implementation is added, while greatly adding security to the kernel.

It will be readily understood that the components of the present embodiments, as generally described and illustrated in the Figures herein, may be arranged and designed in a wide variety of different configurations. Thus, the following detailed description of present embodiments of the invention is not intended to limit the scope of the embodiments, as claimed, but is merely representative of selected embodiments. It should be understood that the various embodiments may be combined with one another and that any one embodiment may be used to modify another embodiment.

References throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

As shown and described herein, a technical solution as described by various embodiments of the invention is presented to the technical problem of protection of a kernel from a sniff and code reuse attacks is provided by developing the system, computer program product, method, and other aspects described and/or illustrated herein.

Referring to FIG. 1, a schematic diagram of a system 100 for protection of a kernel from a sniff and code reuse attack. Displayed is a kernel mode thread 110 and a user mode thread 140 associated with physical memory 190 (i.e., instructions associated with kernel mode thread 110 and user mode thread 140 are loaded to physical memory 190 for execution, as would be understood by one of skill in the art). Context switching allows for dynamic switching between kernel mode thread 110 and user mode thread 140 during execution on one or more central processing unit(s) (not shown), while protecting the kernel. Displayed is a page global directory 128 for kernel mode 110 and a page global directory 152 for user mode 140, with both page global directories 128, 152 contained within physical memory 190. In embodiments of the invention, u-page code 112 is switched from execution associated with a u-page to an s-page to avoid direct access of code contained within by a potential hacker. In these embodiments, this switching serves to protect the kernel from a sniff and code reuse attack by preventing direct access to the code within. In various embodiments of the invention, supervisor mode access prevention is also enabled, with regard to the user page code 112 in order to allow program execution to continue normally. Also displayed in FIG. 1 in kernel mode thread 110 is s-page data 114, as well as kernel space 116, more u-page code 120, u-page data 122, and user space 124. S-page data 114, kernel space 116, u-page code 120, u-page data 122, and user space 124 indicate that in various embodiments of the invention that segmentation is maintained in kernel mode 110 during execution of embodiments of the invention.

Continuing with regard to FIG. 1, also displayed is user mode thread 140. User mode thread 140 contains s-page code 142, as well as other u-page code 144, u-page data 146, and user space 148. Context switching allows for dynamic switching by the central processing system between execution of the user mode thread 140 and the kernel mode 110, while continuing to not allow direct access of certain u-page code 112 in kernel mode 110 (as discussed in connection with embodiments discussed herein), to avoid sniff and code reuse attacks while still allowing normal program execution.

Figure 2:
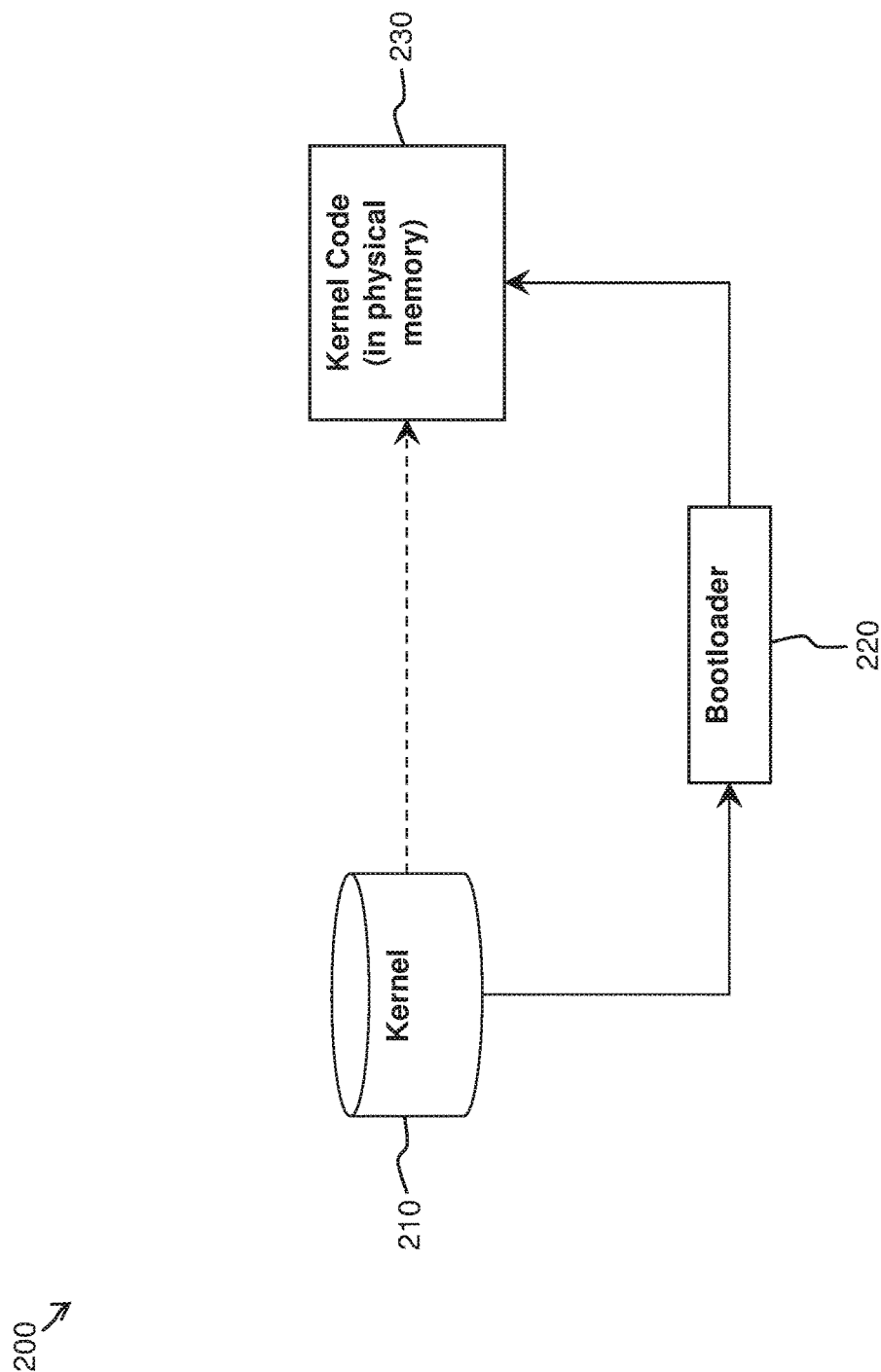
FIG. 2 depicts a structural diagram 200 of various portions of a computer implemented system for protection of a kernel from a sniff and code reuse attack, according to an embodiment of the invention.

Referring to FIG. 2, displayed is a structural diagram 200 of various portions of a computer implemented system for protection of a kernel 210 from sniff and code reuse attacks in an embodiment of the invention. The computer-implemented system displayed 200 may be an x86 processor and instruction set, as understood by one of skill in the art or, in alternative embodiments reside in a virtual machine. Displayed in FIG. 2 is a kernel 210 which is initialized (in a physical machine or alternatively a virtual machine). In various embodiments of the invention, a kernel mode page table associated with kernel 210 is initialized when the kernel is initialized, such as during boot up by setting a bit in the page table. Kernel code from physical memory 230 is loaded into kernel 210 via bootloader 220. In various embodiments of the invention, after kernel code is loaded into kernel 210 via bootloader 220, kernel page entries included in kernel 210 are set from s-pages to u-pages and code contained in the kernel page entries is executed, while not read directly to prevent a sniff and code reuse attack. Since the kernel page entries in kernel 210 cannot be directly read, it is impossible to perform functionality associated with the sniff and code reuse attack, or related types of attacks.

Figure 3:
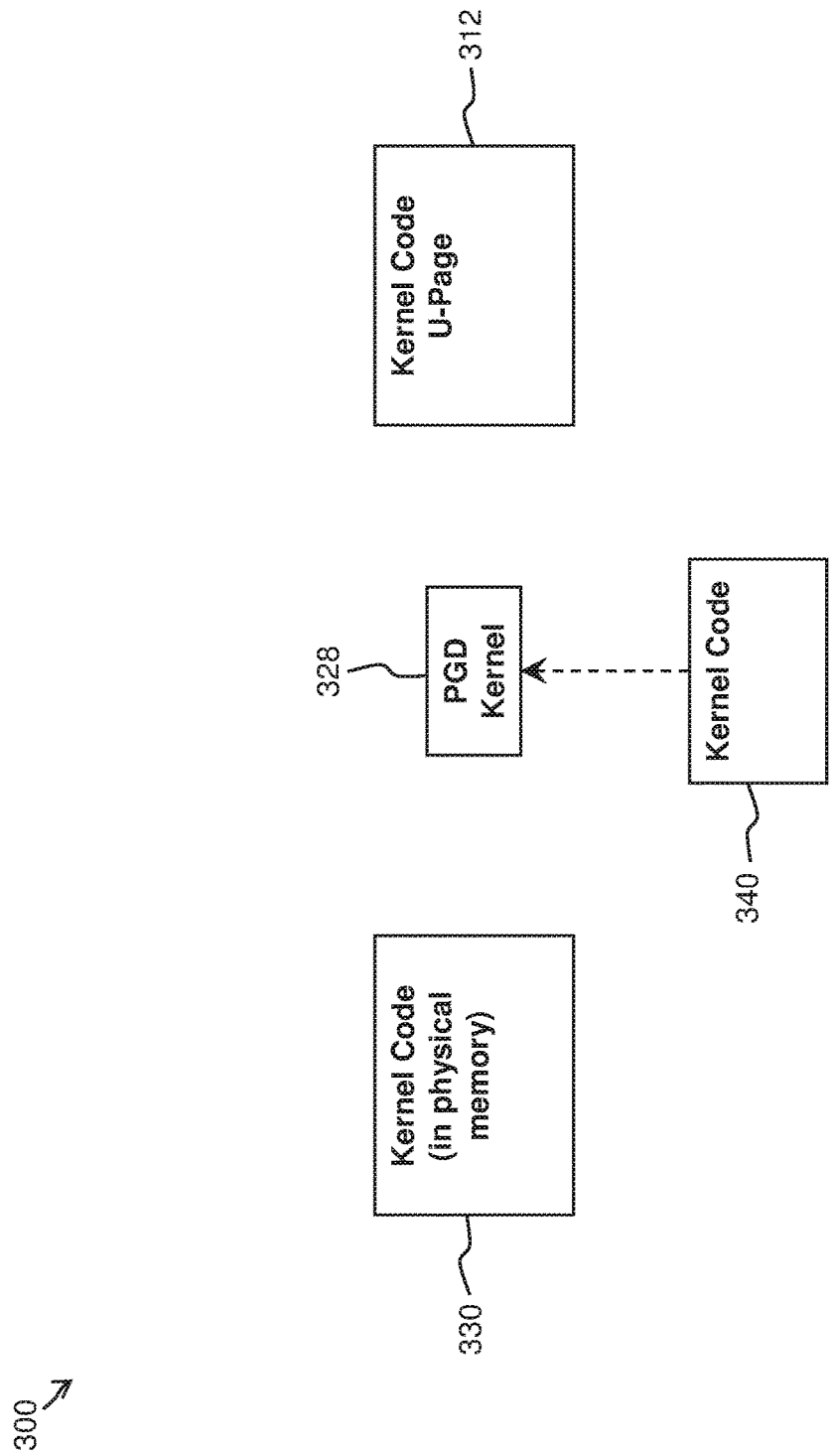
FIG. 3 depicts a structural diagram 300 displaying various portions of a computer implemented system for protection of a kernel from a sniff and code reuse attack, according to an embodiment of the invention.

Referring to FIG. 3, displayed is a structural diagram 300 displaying various portions of a computer-implemented system for protection of a kernel from a sniff and code reuse attacks in an embodiment of the invention. Displayed in FIG. 3 is a kernel code in physical memory 330. Before being loaded into memory, it is available displayed as kernel code 340 for loading. In an embodiment of the invention, kernel code in physical memory 330 is previously initialized, such as discussed in connection with FIG. 2. A bit is set to maintain kernel code in u-page 330, setting the kernel page entries in the kernel mode page table from s-pages to u-pages 312. As is discussed elsewhere herein, kernel code u-page 312 can be executed but not directly accessed to avoid various forms of attacks. Displayed also in FIG. 3 is page global directory 328 for kernel code 330 and kernel code u-page 312. Page global directory 328 assists in loading of kernel code 340, and various other functionality as discussed in embodiments of the invention disclosed herein.

Figure 4:
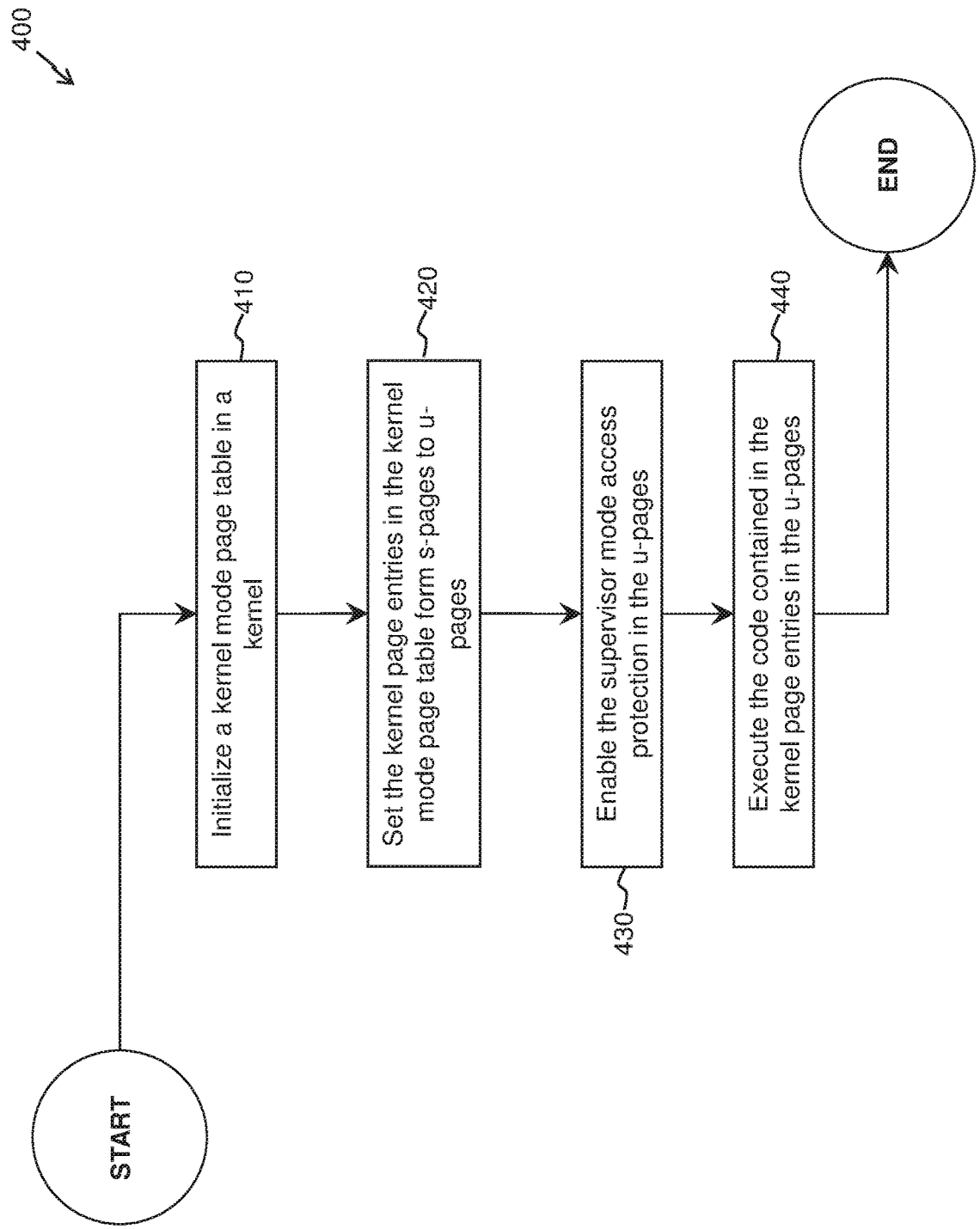
FIG. 4 depicts a flowchart 400 illustrating an embodiment of the invention for protection of a kernel from a sniff and code reuse attack, according to an embodiment of the invention.

Referring to FIG. 4, displayed is a flowchart 400 illustrating an embodiment of the invention for protection of a kernel from a sniff and code reuse attack. At step 410, a kernel mode page table is initialized for a kernel. In various embodiments of the invention, at step 410 the kernel page mode table is initialized by setting a bit in the page table, and such bit is understood by the operating system. At step 420, kernel page mode entries in the kernel mode page table are set from s-pages to u-pages. Step 420 may take place, in various embodiments of the invention, from a user mode. At step 430, supervisor mode access prevention is enabled in the u-pages. At step 440, code contained in kernel page entries in the u-pages is executed, but the code is u-pages is capable of execution but is not capable of being accessed and read directly, to prevent various attacks as discussed herein.

The present invention may be a method, computer program product, and/or computer system at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, computer program products, and apparatus (systems) according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of method, system, and computer program product according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer program instructions.

Based on the foregoing, a method, system, and computer program product have been disclosed. However, numerous modifications and substitutions can be made without deviating from the scope of the present invention. Therefore, the present invention has been disclosed by way of example and not limitation.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalents.

What is claimed is:

1. A computer-implemented method for protection of a kernel from a sniff and code reuse attacks, the method comprising:
   initializing by a computing device a kernel mode page table in a kernel;
   setting by the computing device one or more kernel page entries in the kernel mode page table from s-pages to u-pages;
   enabling by the computing device supervisor mode access prevention in the u-pages; and executing by the computing device code contained in the kernel page entries in the u-pages, wherein the kernel page entries in the u-pages are capable of execution but are not capable of being accessed and read directly.

2. The computer-implemented method of claim 1, wherein the kernel mode page table is initialized by setting a bit in the page table.

3. The computer-implemented method of claim 1, wherein when setting by the computing device the kernel mode page entries from s-pages to u-pages, the setting is performed within a user mode.

4. The computer-implemented method of claim 1, wherein s-pages are in supervisor mode and u-pages are in user mode.

5. The computer-implemented method of claim 1, wherein the kernel is implemented in a virtual machine.

6. The computer-implemented method of claim 1, wherein the kernel is utilized in an x86 architecture.

7. A computer system, comprising:
or more processors; and
a memory storing a program which, when executed on the processor, performs an operation for protection of a kernel from a sniff and code reuse attack, the operation comprising:
initializing by a computing device a kernel mode page table in a kernel;
setting by the computing device one or more kernel page entries in the kernel mode page table from s-pages to u-pages;
enabling by the computing device supervisor mode access prevention in the u-pages; and
executing by the computing device code contained in the kernel page entries in the u-pages, wherein the kernel page entries in the u-pages are capable of execution but are not capable of being accessed and read directly.

8. The computer system of claim 7, wherein the kernel mode page table is initialized by setting a bit in the page table.

9. The computer system of claim 7, wherein when setting by the computing device the kernel mode page entries from s-pages to u-pages, the setting is performed within a user mode.

10. The computer system of claim 7, wherein s-pages are in supervisor mode and u-pages are in user mode.

11. The computer system of claim 7, wherein the kernel is implemented in a virtual machine.

12. The computer system of claim 7, wherein the kernel is utilized in an x86 architecture.

13. A computer program product for protection of a kernel from a sniff and code reuse attack, the computer program product comprising a non-transitory computer-readable storage medium having program instructions embodied therewith, the program instructions executable by a computer to perform a method comprising:
initializing by a computing device a kernel mode page table in a kernel;
setting by the computing device one or more kernel page entries in the kernel mode page table from s-pages to u-pages;
enabling by the computing device supervisor mode access prevention in the u-pages; and
executing by the computing device code contained in the kernel page entries in the u-pages, wherein the kernel page entries in the u-pages are capable of execution but are not capable of being accessed and read directly.

14. The computer program product of claim 13, wherein the kernel mode page table is initialized by setting a bit in the page table.

15. The computer program product of claim 13, wherein when setting by the computing device the kernel mode page entries from s-pages to u-pages, the setting is performed within a user mode.

16. The computer program product of claim 13, wherein s-pages are in supervisor mode and u-pages are in user mode.

17. The computer program product of claim 13, wherein the kernel is implemented in a virtual machine.

18. The computer program product of claim 13, wherein the kernel is utilized in an x86 architecture.

\* \* \* \* \*